US009602397B2

(12) United States Patent
Mizukoshi

(10) Patent No.: US 9,602,397 B2
(45) Date of Patent: Mar. 21, 2017

(54) FLOW CONTROL APPARATUS, NETWORK SYSTEM, NETWORK CONTROL METHOD, AND PROGRAM

(75) Inventor: Yasuhiro Mizukoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1017 days.

(21) Appl. No.: 13/137,198

(22) Filed: Jul. 27, 2011

(65) Prior Publication Data

US 2011/0286332 A1 Nov. 24, 2011

Related U.S. Application Data

(63) Continuation of application No. PCT/JP2010/069993, filed on Nov. 10, 2010.

(30) Foreign Application Priority Data

Nov. 27, 2009 (JP) .............................. P2009-269959

(51) Int. Cl.
*H04L 12/26* (2006.01)
*H04L 12/721* (2013.01)
*H04L 12/841* (2013.01)

(52) U.S. Cl.
CPC .............. *H04L 45/38* (2013.01); *H04L 47/28* (2013.01)

(58) Field of Classification Search
USPC ........................................ 370/395, 389, 252
See application file for complete search history.

(56) References Cited

U.S. PATENT DOCUMENTS

| 6,993,348 | B2 | 1/2006 | Ikegami et al. | |
|---|---|---|---|---|
| 7,295,557 | B2 * | 11/2007 | Clayton et al. | ............ 370/395.4 |
| 2005/0259651 | A1 * | 11/2005 | Yashima | ........................ 370/389 |
| 2010/0195515 | A1 * | 8/2010 | Lin et al. | ...................... 370/252 |

FOREIGN PATENT DOCUMENTS

| JP | 6-112944 A | 4/1994 |
|---|---|---|
| JP | 2004-40552 A | 2/2004 |

OTHER PUBLICATIONS

International Search Report (ISR) (PCT Form PCT/ISA/210) dated Dec. 28, 2010, previously submitted on Jul. 27, 2011.

(Continued)

*Primary Examiner* — Kevin C Harper
*Assistant Examiner* — Derrick V Rose
(74) *Attorney, Agent, or Firm* — McGinn IP Law Group, PLLC.

(57) ABSTRACT

A flow control apparatus that sends control information to one or more switching node apparatuses, where the control information is assigned to each series of communications performed between terminal devices via the switching node apparatuses. The flow control apparatus includes an effective time setting unit that sets an effective time of the control information based on an elapsed time measured from when the terminal devices which perform the series of communications start a communication via a specific one of the switching node apparatuses, in a manner such that the longer the elapsed time, the longer the effective time; and a sending unit that sends the control information every time when the effective time has elapsed.

20 Claims, 14 Drawing Sheets

(56) References Cited

OTHER PUBLICATIONS

Hiroshi Ueno, et al., "CPSY2009-36 A Study on Deployment of Network Appliance Functionalities in Datacenter Network", IEICE Technical Report, Nov. 13, 2009 (Nov. 13, 2009), vol. 109, No. 296, pp. 7-12.

Akio Iijima, et al., "Sentan Kankyo Gijutsu Cloud Computing Jidai no Data Center to Network no Sho Energy Gijutsu", NEC Technical Journal, Sep. 25, 2009 (Sep. 25, 2009), vol. 62, No. 3, pp. 117-120.

\* cited by examiner

FIG. 10

| CURRENT TIME - PREVIOUS MOVEMENT TIME (sec) | EFFECTIVE TIME |
|---|---|
| 0~2 | 1 |
| 2~5 | 2 |
| 5~30 | 5 |
| 30~180 | 30 |
| 180~900 | 180 |
| 900~3600 | 900 |
| 3600~ | 3600 | ns
FLOW CONTROL APPARATUS, NETWORK SYSTEM, NETWORK CONTROL METHOD, AND PROGRAM

CROSS-REFERENCE TO RELATED APPLICATION

This is a Continuation Application of International Application No. PCT/JP2010/069993, filed Nov. 10, 2010, which claims priority on Japanese Patent Application No. 2009-269959 (filed Nov. 27, 2009). The contents of the aforementioned application are incorporated herein by reference.

TECHNICAL FIELD

The present invention relates to a flow control apparatus, a network system, a network control method, and a program.

BACKGROUND ART

In a technique (e.g., open flow switching) for concentratedly controlling communications on a network, one flow control apparatus is provided within the network, and sends control information to each switching node apparatus on the network regularly. In accordance with the control information, each switching node apparatus performs data transmission.

FIG. 11 is a diagram showing an example of a network configuration using the open flow switching technique.

In FIG. 11, a network 1000 includes a flow control apparatus 2001 and switching node apparatuses 3001 to 3005. In the figure, port numbers of each switching node apparatus are shown by P1 to P5. Each switching node apparatus may have further ports in addition to those shown in FIG. 11.

The switching node apparatuses 3001 to 3005 each receive control information from the flow control apparatus 2001, and perform a data transmission process in accordance with the control information.

The flow control apparatus 2001 concentratedly the switching node apparatuses 3001 to 3005, and stores connection relationships between the switching node apparatuses. For a flow which is a specific communication between terminal devices 4001 to 4003, the flow control apparatus 2001 performs determination of whether or not the communication can be executed, route determination, band control, packet priority control between the current flow and another flow, and the like.

The terminal devices 4001 to 4003 performs communication therebetween via the network 1000, and they each are a terminal device having a display, such as a personal computer or a cellular phone, or a server device (e.g. work station) which provides a service (e.g., provision of information) to such a terminal device.

FIG. 12 is a diagram showing a data flow when a terminal device connected to a switching node apparatus starts communication. Specifically, FIG. 12 shows a data flow when the terminal device 4002 connected to the switching node apparatus 3005 starts communication with the terminal device 4003 connected to the same switching node apparatus 3005.

First, the terminal device 4002, which desires to communicates with the terminal device 4003, sends an initial packet, to the switching node apparatus 3005 (see arrow C121).

The above initial packet is a packet sent at the starting of communication, and may be an ARP (address resolution protocol) packet, an SYN (synchronize) packet) of TCP (transmission control protocol), or an initial UDP (user datagram protocol) packet having a specific IP (Internet protocol) address and a specific port number.

The switching node apparatus 3005, which received the initial packet from the terminal device 4002, sends an inquiry packet for requesting the flow control apparatus 2001 to send control information (see arrow C122).

The flow control apparatus 2001 which received the inquiry packet determines whether or not a target flow (i.e., communication between the terminal devices 4002 and 4003) can be transferred.

If it is determined that the transfer can be performed, the flow control apparatus 2001 sends a response packet to the switching node apparatus 3005 (see arrow C123). The response packet shows control information and a predetermined time period (e.g., 4 sec) as an effective time for the control information. The control information includes the determined approval or disapproval for the transfer, and a communication protocol (selection between TCP or UDP), a communication route (i.e., output port numbers for the communication), band control information, and priority control information for the relevant flow.

When receiving a response packet, which indicates the approval for the transfer, from the flow control apparatus 2001, the switching node apparatus 3005 retrieves the control information and the effective time from the response packet, and stores them into the flow table T3005. Based on the control information stored in the flow table T3005, the switching node apparatus 3005 performs the communication transfer for the relevant flow.

In the flow table T3005 of FIG. 12, "4002-4003" indicates communication between the terminal devices 4002 and 4003, "P4-P3" indicates that the relevant communication is performed between port P4 and port P3, and "(4)" indicates that the effective time of the relevant information is 4 sec.

Although other information such as information of the communication protocol, band control information, and priority information for the relevant flow is also stored in the flow table, they are not shown in FIG. 12.

FIG. 13 is a diagram showing a data flow when the effective time has elapsed. In FIG. 12, the switching node apparatus 3005 sends an inquiry packet when receiving a packet from the terminal device 4002 as a trigger. In contrast, in FIG. 13, the switching node apparatus 3005 sends an inquiry packet when the effective time has elapsed, which functions as a trigger.

Based on each effective time shown in the flow tables T3001 to T3005, the switching node apparatuses 3001 and 3005 each issues an inquiry to the flow control apparatus 2001 and updates the flow table, regularly.

More specifically, if communication between the terminal devices 4002 and 4003 is again executed within the effective time of 4 seconds (shown in the flow table T3005) measured from when the switching node apparatus 3005 sends an inquiry packet to the flow control apparatus 2001 (see FIG. 12), then the switching node apparatus 3005 sends an inquiry packet to the flow control apparatus 2001 when the effective time (4 sec) has elapsed (see arrow C131).

Similar to the initial inquiry, the flow control apparatus 2001 generates and sends a response packet to the switching node apparatus 3005 (see arrow C132).

Also similar to the initial inquiry, the switching node apparatus 3005 performs communication transfer based on the control information retrieved from the response packet.

If communication between the terminal devices 4002 and 4003 is not again executed within the effective time, the switching node apparatus 3005 deletes the information about the relevant communication flow from the flow table T3005.

FIG. 14 is a diagram showing a data flow when a terminal device changes the switching node apparatus to which the terminal device is connected. In an example of such a case, a terminal device and a switching node apparatus are connected to each other via wireless communication, and then the terminal device escapes from the accessible area of the switching node apparatus and moves to an accessible area of another switching node apparatus.

In an initial state, the terminal device 4001 is connected to the switching node apparatus 3002, and communicates with the terminal device 4003 via the switching node apparatus 3002. In this process, the switching node apparatus 3002 issues an inquiry to the flow control apparatus 2001 as explained using FIGS. 12 and 13, and stores the control information and the effective time into the flow table T3002.

Next, the terminal device 4001 is connected to the switching node apparatus 3004, and again communicates with the terminal device 4003 via the switching node apparatus 3004.

When the terminal device 4001 is connected to the switching node apparatus 3004, the switching node apparatus 3004 issues an inquiry to the flow control apparatus 2001 as explained using FIG. 12, and stores the control information and the effective time into the flow table T3004.

After the connection with the terminal device 4001 is disconnected, the switching node apparatus 3002 deletes the relevant control information and the effective time stored in the flow table T3002 when the effective time has elapsed.

DISCLOSURE OF INVENTION

Problem to be Solved by the Invention

As shown in FIG. 13 in which the switching node apparatus 3005 sends an inquiry packet to the flow control apparatus 2001 every time when 4 sec (effective time) has elapsed, and the flow control apparatus 2001 sends a response packet, the switching node apparatus sends an inquiry packet to the flow control apparatus every time when the effective time has elapsed, and the flow control apparatus sends a response packet to the switching node apparatus. Therefore, if the number of the terminal devices which performs communication increases, the amount of communication on the relevant network increases due to the inquiry packets and the response packets.

In addition, if the terminal device changes the switching node apparatus to which it connects (for example, so that the switching node apparatus 3002 in FIG. 14 deletes the control information in the flow table T3002 when the effective time has elapsed), the previous route (before the change of the switching node apparatus) remains until the effective time has elapsed.

Such a previous route may be used for an evil purpose, that is, as a secret path for the relevant flow.

Additionally, when a previous route remains, it is possible for a switching node apparatus to erroneously transfer data (for example, in FIG. 14, after the terminal device 4001 is connected to the switching node apparatus 3004, the switching node apparatus 3005 transfer a packet addressed from the terminal device 4003 to 4001, to the switching node apparatus 3002).

If a relatively long effective time is set so as to decrease the frequency of sending the inquiry packet and response packet and thus to reduce the amount of communication on the network, the time period during which the previous route remains (after the terminal device changes the switching node apparatus to which it connects) increases, thereby increasing the possibility that the previous route is used for an evil purpose, or the switching node apparatus erroneously transfers data.

In contrast, if a relatively long effective time is set so as to reduce the time during which the previous route remains (after the terminal device changes the switching node apparatus to which it connects), the frequency of sending the inquiry packet and response packet increases, thereby increasing the amount of communication on the network.

In light of the above circumstances, an object of the present invention is to provide a flow control apparatus, a network system, a network control method, and a program, so as to reduce the possibility of damage occurrence due to a remaining previous route (after the terminal device changes the switching node apparatus to which it connects) while preventing an increase in the amount of communication on the network.

Means for Solving the Problem

In order to solve the above-described problems, the present invention provides a flow control apparatus that sends control information to one or more switching node apparatuses, where the control information is assigned to each series of communications performed between terminal devices via the switching node apparatuses, and the flow control apparatus comprises:

an effective time setting unit that sets an effective time of the control information based on an elapsed time measured from when the terminal devices which perform the series of communications start a communication via a specific one of the switching node apparatuses, in a manner such that the longer the elapsed time, the longer the effective time; and a sending unit that sends the control information every time when the effective time has elapsed.

In a typical example, the effective time setting unit determines whether or not at least one of the terminal devices has changed the switching node apparatus to which it connects, and if it is determined that the change has occurred, the effective time is set to a shorter time than an effective time set when it is determined that the change has not occurred.

In a preferable example for the above case, if it is determined that no one of the terminal devices has changed the switching node apparatus to which it connects, then the effective time setting unit sets a next effective time as twice as a currently-set effective time.

In another preferable example, if it is determined that no one of the terminal devices has changed the switching node apparatus to which it connects, then the effective time setting unit sets a next effective time by adding a predetermined time to a currently-set effective time.

In another preferable example, if it is determined that at least one of the terminal devices has changed the switching node apparatus to which it connects, then the effective time setting unit updates the effective time to be a value as half as the relevant effective time.

In another preferable example, if it is determined that at least one of the terminal devices has changed the switching node apparatus to which it connects, then the effective time setting unit sets a next effective time by subtracting a predetermined time from a currently-set effective time.

Preferably, the flow control apparatus further comprises:
a storage unit that stores a correspondence table which shows corresponding relationships between the effective time and an elapsed time measured from when each terminal device connects a specific one of the switching node apparatuses; and the effective time setting unit sets a next effective time based on the correspondence table.

The present invention also provides a network system having one or more switching node apparatuses and a flow control apparatus that sends control information assigned to each series of communications performed between terminal devices via the switching node apparatuses, wherein:

the flow control apparatus comprises:

an effective time setting unit that sets an effective time of the control information based on an elapsed time measured from when the terminal devices which perform the series of communications start a communication via a specific one of the switching node apparatuses, in a manner such that the longer the elapsed time, the longer the effective time; and a sending unit that sends the control information every time when the effective time has elapsed; and the switching node apparatuses perform communication control based on the control information.

The present invention also provides a network control method for a flow control apparatus that sends control information to one or more switching node apparatuses, where the control information is assigned to each series of communications performed between terminal devices via the switching node apparatuses, and the flow control apparatus performs:

an effective time setting step that sets an effective time of the control information based on an elapsed time measured from when the terminal devices which perform the series of communications start a communication via a specific one of the switching node apparatuses, in a manner such that the longer the elapsed time, the longer the effective time; and a sending step that sends the control information every time when the effective time has elapsed.

The present invention also provides a program by which a flow control apparatus, that sends control information to one or more switching node apparatuses, executes steps, where the control information is assigned to each series of communications performed between terminal devices via the switching node apparatuses, and the steps include:

an effective time setting step that sets an effective time of the control information based on an elapsed time measured from when the terminal devices which perform the series of communications start a communication via a specific one of the switching node apparatuses, in a manner such that the longer the elapsed time, the longer the effective time; and a sending step that sends the control information every time when the effective time has elapsed.

Effect of the Invention

In accordance with the present invention, it is possible to reduce the possibility of damage occurrence due to a remaining previous route (after the terminal device changes the switching node apparatus to which it connects) while preventing an increase in the amount of communication on the network.

BRIEF DESCRIPTION OF THE DRAWINGS

FIG. 10 shows showing a correspondence table in the embodiment, which shows corresponding relationships between the effective time of the control information for flow tables and difference between the current time and a previous movement time at which each terminal device latest changed the switching node apparatus to which it connects.

MODE FOR CARRYING OUT THE INVENTION

Below, an embodiment of the present invention will be explained with reference to the drawings.

Figure 1:
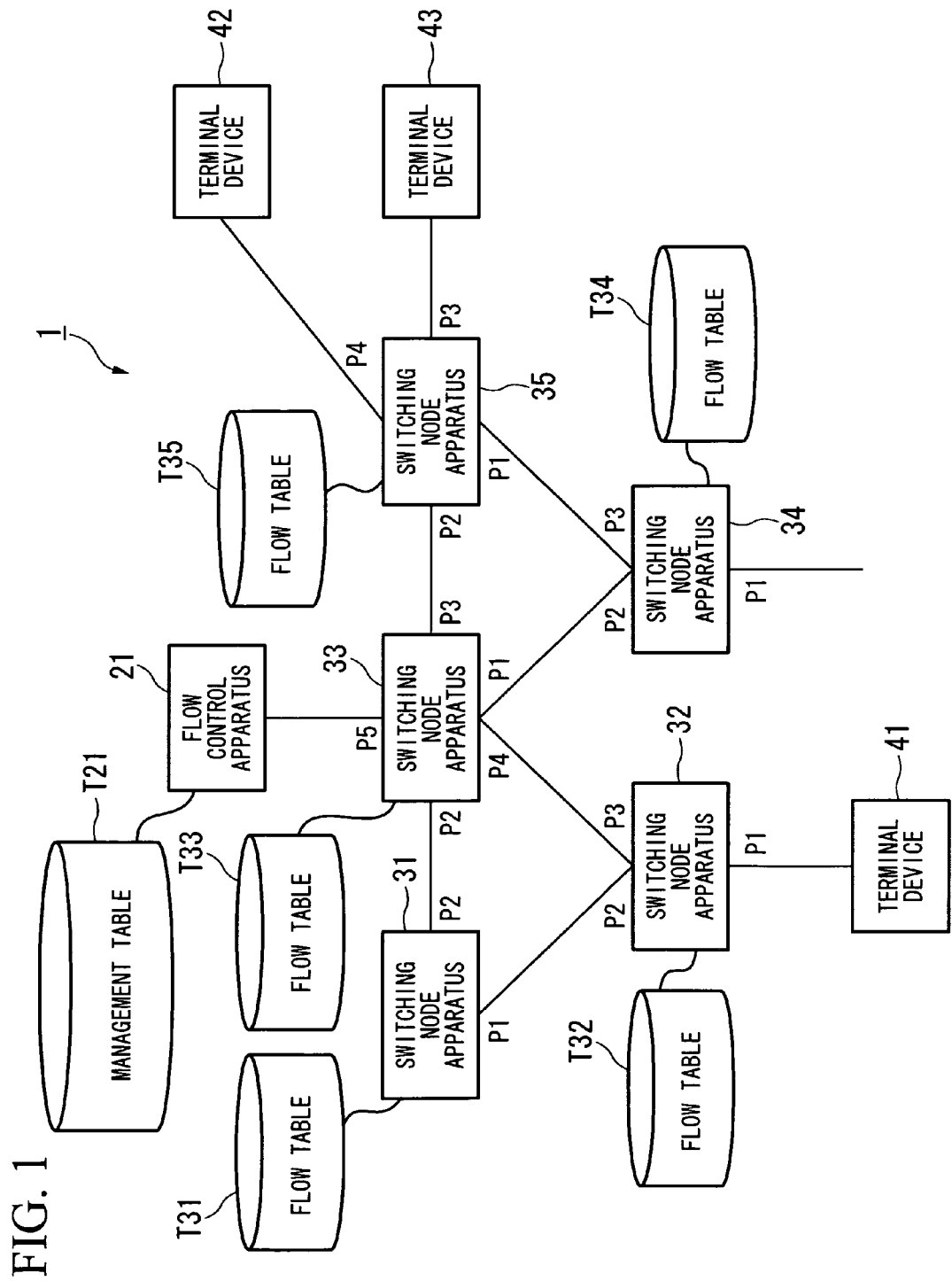
FIG. 1 is a diagram showing a system configuration of a network system as an embodiment of the present invention.

FIG. 1 is a diagram showing a system configuration of a network system as an embodiment of the present invention.

In FIG. 1, a network 1 has a flow control apparatus 21 and switching node apparatuses 31 to 35.

As shown in FIG. 1, a port P1 of the switching node apparatus 31 is connected to a port P2 of the switching node apparatus 32; a port P2 of the switching node apparatus 31 is connected to a port P2 of the switching node apparatus 33; a port P1 of the switching node apparatus 32 is connected to a terminal device 41; a port P3 of the switching node apparatus 32 is connected to a port P4 of the switching node apparatus 33; a port P1 of the switching node apparatus 33 is connected to a port P2 of the switching node apparatus 34; a port P3 of the switching node apparatus 33 is connected to a port P2 of the switching node apparatus 35; a port P5 of the switching node apparatus 33 is connected to the flow control apparatus 21; a port P3 of the switching node apparatus 34 is connected to a port P1 of the switching node apparatus 35; a port P3 of the switching node apparatus 35 is connected to a terminal device 43; and a port P4 of the switching node apparatus 35 is connected to a terminal device 42.

The switching node apparatuses 31 to 35 each receive control information from the flow control apparatus 21, and perform a data transfer process in accordance with the control information.

The flow control apparatus 21 concentratedly the switching node apparatuses 31 to 35, and stores information about connection relationships and communication control between the switching node apparatuses. The flow control apparatus 21 also stores a connection start time of each of the terminal devices 41 to 43 (i.e., a time when the terminal device starts connection to the currently-connected switching node apparatus) in a management table T21, and performs determination of whether or not the communication can be executed, route determination, band control, packet priority control between the current flow and another flow, and the like.

Actually, a storage unit 270 (explained later) in the flow control apparatus 21 stores the management table T21.

The terminal devices 41 to 43 performs communication therebetween via the network 1, and they each are a terminal device having a display, such as a personal computer or a cellular phone, or a server device (e.g. work station) which provides a service (e.g., provision of information) to such a terminal device.

Figure 2:
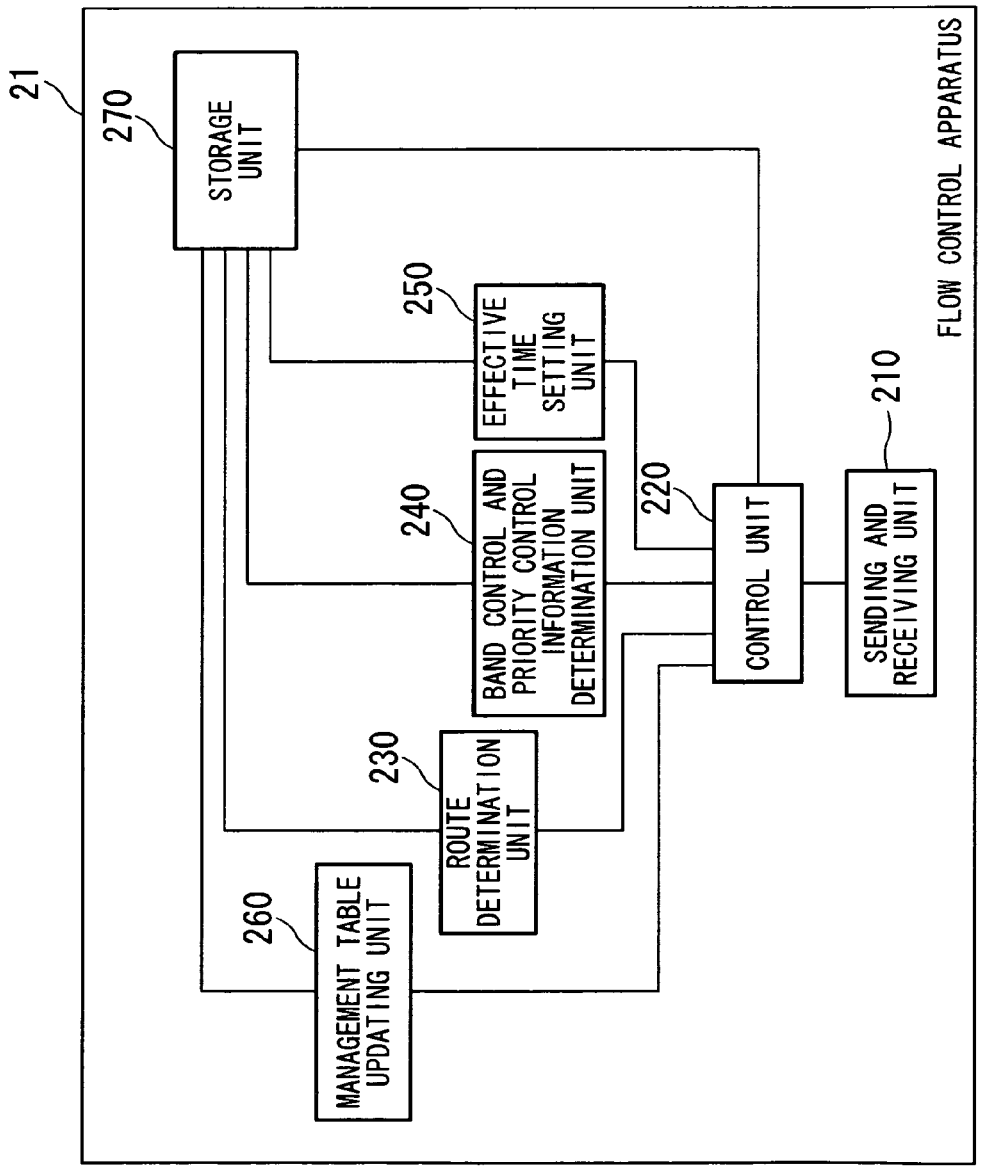
FIG. 2 is a diagram showing the general structure of the flow control apparatus 21 in the embodiment.

FIG. 2 is a diagram showing the general structure of the flow control apparatus 21.

In FIG. 2, the flow control apparatus 21 has a sending and receiving unit (corresponding to the sending unit of the present invention) 210, a control unit 220, a route determination unit 230, a band control and priority control information determination unit 240, an effective time setting unit 250, a management table updating unit 260, and the storage unit 270.

The sending and receiving unit 210 is connected to the network 1, and performs transmission and reception of inquiry and response packets between the flow control apparatus 21 and each switching node apparatus. When receiving an inquiry packet, the sending and receiving unit 210 outputs the received inquiry packet to the control unit 220.

The control unit 220 generates flow information relating to a flow indicated by the inquiry packet by controlling each relevant unit, and stores the flow information into the storage unit 270. The control unit 220 also generates a response packet in response to the inquiry packet output from the sending and receiving unit 210, and outputs the response packet to the sending and receiving unit 210.

More specifically, the control unit 220 retrieves from the inquiry packet, identification information for the terminal device which requests communication; identification information for the switching node apparatus to which the terminal device which requests communication is connected; a port number to which the terminal device which requests communication is connected; identification information for the terminal device as the partner of the relevant communication; and a transmission time of the inquiry packet. The control unit 220 further retrieves identification information for the switching node apparatus to which the terminal device as the communication partner is connected; a port number to which the terminal device as the communication partner is connected; and flow type information (about communication protocol such as whether TCP or UDP, and packet type such as whether a mail packet or a Web display data packet). The control unit 220 outputs the retrieved information to the route determination unit 230, the band control and priority control information determination unit 240, and the effective time setting unit 250, and stores information output from these units into the storage unit 270.

In addition, the control unit 220 generates a response packet based on such information output from the above-described units, or information retrieved from the storage unit 270, and outputs the response packet to the sending and receiving unit 210.

The route determination unit 230 determines a route for the target flow to be processed, based on information about the connection position of the terminal device which requests the communication; information about the connection position of the terminal device as the communication partner; and flow type information (which are output from the control unit 220), and also by retrieving information which indicates connection relationships on the network 1 from the storage unit 270. The route determination unit 230 outputs the determined route to the control unit 220.

As the route determination method, the route determination unit 230 may select a route having the minimum number of the switching node apparatuses to be relayed. However, the route determination method is not limited to the above, and another method can be employed. For example, based on the flow type information, a route having a large communication capacity may be assigned to a flow having a large amount of communication which may contain video data.

Based on the flow type information output from the control unit 220, the band control and priority control information determination unit 240 determines for the relevant flow, band control information (for each packet) and priority control information (for packet transmission of the relevant flow to the other flows), and outputs the determined information to the control unit 220.

The effective time setting unit 250 determines whether or not the storage unit 270 stores the effective time of the current flow by using key information which is the identification information of the terminal device which requests the communication, the identification information of the terminal device as the communication partner, and the flow type information, which are output from the control unit 220. If it is determined that the relevant effective time is stored, a new effective time is set based on the stored effective time. If it is determined that the relevant effective time is not stored, a predetermined effective time is set as a new effective time. The effective time setting unit 250 outputs the set effective time to the control unit 220.

The management table updating unit 260 performs updating of the storage unit 270 by using the identification information of the terminal device which requests the communication, the identification information of the switching node apparatus to which the terminal device (which requests the communication) is connected, the port number to which the terminal device (which requests the communication) is connected, and the transmission time of the inquiry packet, which are output from the control unit 220.

The storage unit 270 stores information which indicates the connection relationships on the network 1. The storage unit 270 also stores flow information which includes (i) the route information for each flow, which is generated by the route determination unit 230; (ii) the band control information and the priority control information for each flow, which is generated by the band control and priority control information determination unit 240; and (iii) the effective time of the control information for each flow, where the effective time is generated by the effective time setting unit 250. The storage unit 270 further stores the management table T21 which will be explained later.

Figure 3:
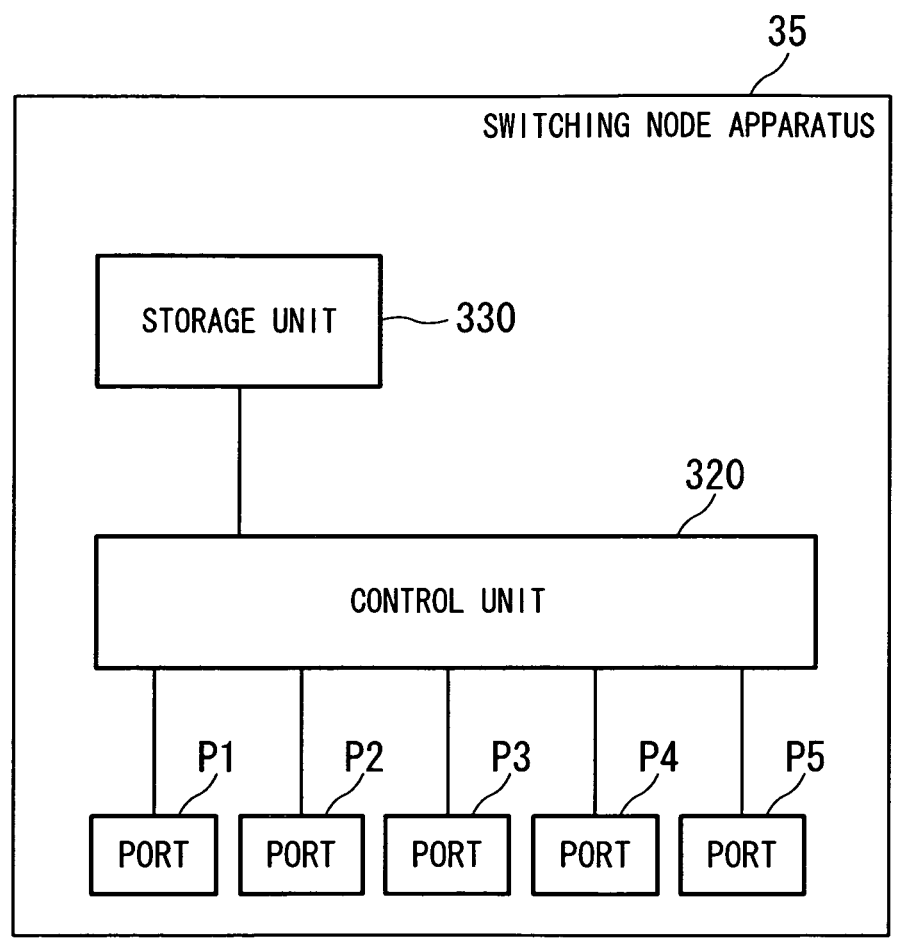
FIG. 3 is a diagram showing the general structure of the switching node apparatus 35 in the embodiment.

FIG. 3 is a diagram showing the general structure of the switching node apparatus 35.

In FIG. 3, the switching node apparatus 35 has ports P1 to P5, a control unit 320, and a storage unit 330.

The ports P1 to P5 are used to connected to the terminal devices 42 and 43 and other switching node apparatuses 33 and 34, so as to perform packet transmission and reception between the switching node apparatus 35 and the above terminal devices and switching node apparatuses.

In the present embodiment, as shown in FIG. 1, the port P1 of the switching node apparatus 35 is connected to the port P3 of the switching node apparatus 34; the port P2 of the switching node apparatus 35 is connected to the port P3 of the switching node apparatus 33; the port P3 of the switching node apparatus 35 is connected to the terminal device 43; the port P4 of the switching node apparatus 35 is connected to the terminal device 42; and the port P5 of the switching node apparatus 35 is empty. The ports P1 to P5 each output the received packet to the control unit 320, and send a packet output from the control unit 320.

Figure 4:
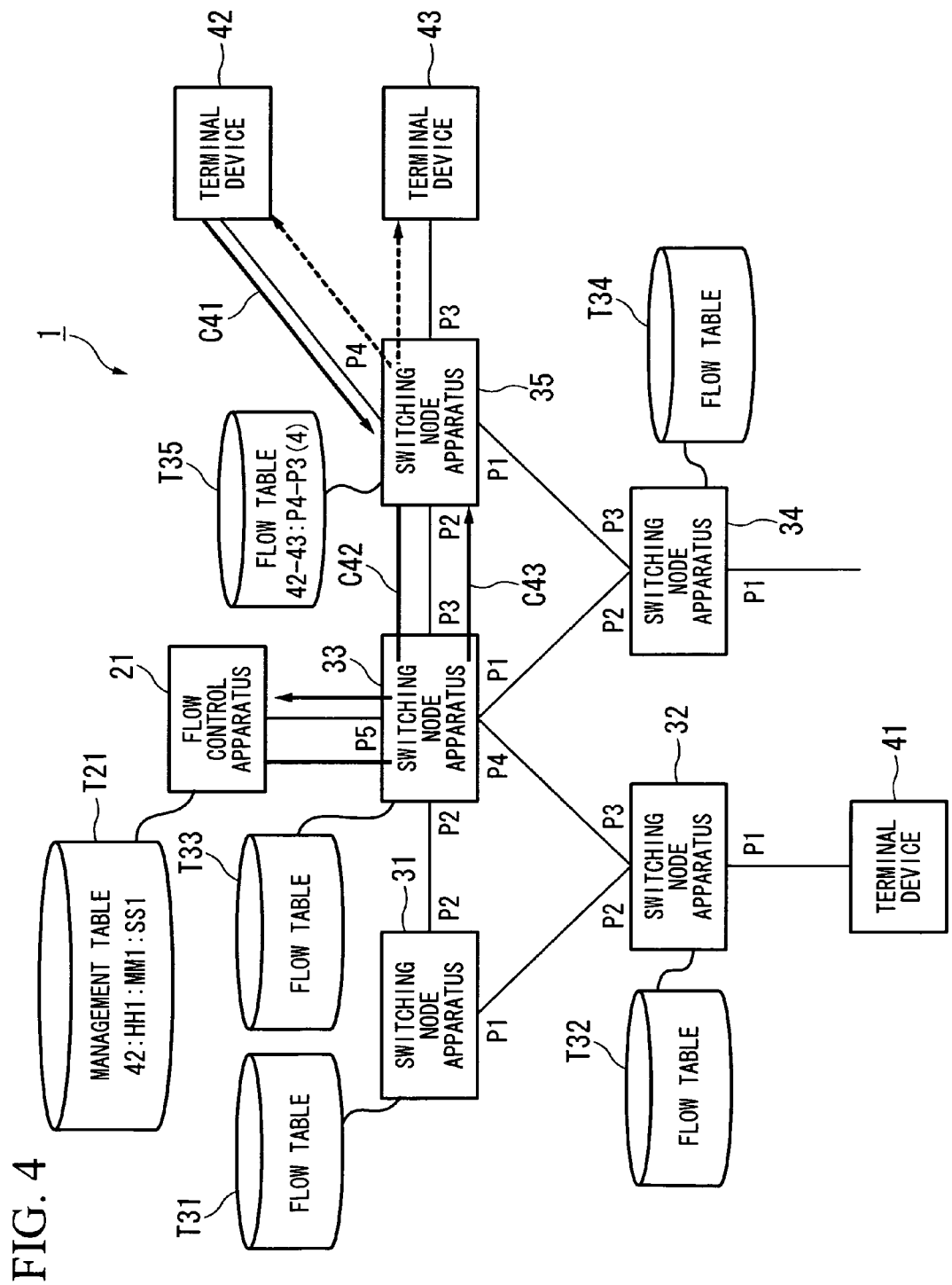
FIG. 4 is a diagram showing a data flow when a terminal device connected to a switching node apparatus starts communication in the embodiment.

When receiving an initial packet from a terminal device (e.g., terminal device 42) via one of the ports P1 to P5 (e.g., P4), the control unit 320 generates an inquiry packet in accordance with this initial packet, and sends it to the flow control apparatus 21 via one of the ports P1 to P5 (e.g., P2 in the example of FIG. 4).

The storage unit 330 stores the flow table T35 which stores the control information of each flow, and the route (i.e., output port number) toward the flow control apparatus 21.

Since the switching node apparatus 31 to 34 each have a general structure similar to that of the switching node apparatus 35, explanations thereof are omitted here. The switching node apparatus 31 to 35 each may have a number of the ports other than 5 which is shown in FIG. 3. Additionally, the number of ports may be different between the switching node apparatuses.

FIG. 4 is a diagram showing a data flow when a terminal device connected to a switching node apparatus starts communication. Specifically, FIG. 4 shows a data flow when the terminal device 42 connected to the switching node apparatus 35 starts communication with the terminal device 43 connected to the same switching node apparatus 35.

First, the terminal device 42, which desires to communicates with the terminal device 43, sends an initial packet, to the switching node apparatus 35 (see arrow C41).

The switching node apparatus 35, which received the initial packet from the terminal device 42, sends an inquiry packet for requesting the flow control apparatus 21 to send control information (see arrow C42).

The flow control apparatus 21 which received the inquiry packet determines whether or not packets of a target flow (i.e., communication between the terminal devices 42 and 43) can be transferred. For example, the flow control apparatus 21 determines whether or not the packets can be transferred by means of filtering based on the addresses of the device which requests communication and the partner device.

If it is determined that the transfer can be performed, the flow control apparatus 21 stores the control information (which includes the communication route, the band control information, and the priority control information) and the effective time of the control information into the storage unit 270 (see FIG. 2), and sends a response packet, which indicates the control information and the effective time, to the switching node apparatus 35 (see arrow C43).

Such information may be generated by the flow control apparatus 21 when receiving the inquiry packet, or may be selected in accordance with the received inquiry packet from among information items generated by the flow control apparatus 21 in advance before receiving the inquiry packet.

In addition, the flow control apparatus 21 associates the identification information of the terminal device (42 in the example of FIG. 4), which requests the communication, with the connection start time, and stores the associated data into the management table T21.

In the management table T21 of FIG. 4, "42" indicates the terminal device 42, and "HH1:MM1:SS1" indicates the connection start time of this terminal device.

When receiving a response packet, which indicates the approval for the transfer, from the flow control apparatus 21, the switching node apparatus 35 retrieves the control information and the effective time from the received response packet, and stores them into the flow table T35. Based on the control information stored in the flow table T35, the switching node apparatus 3005 performs the communication transfer for the relevant flow.

In the flow table T35 of FIG. 4, "42-43" indicates communication between the terminal devices 42 and 43, "P4-P3" indicates that the relevant flow is performed via the ports P4 and P3 of the switching node apparatus 35, and "(4)" indicates that the effective time of the relevant control information is 4 sec.

Although other information such as information of the communication protocol, band control information, and priority information is also stored in the flow table, they are not shown in FIG. 4.

Figure 5:
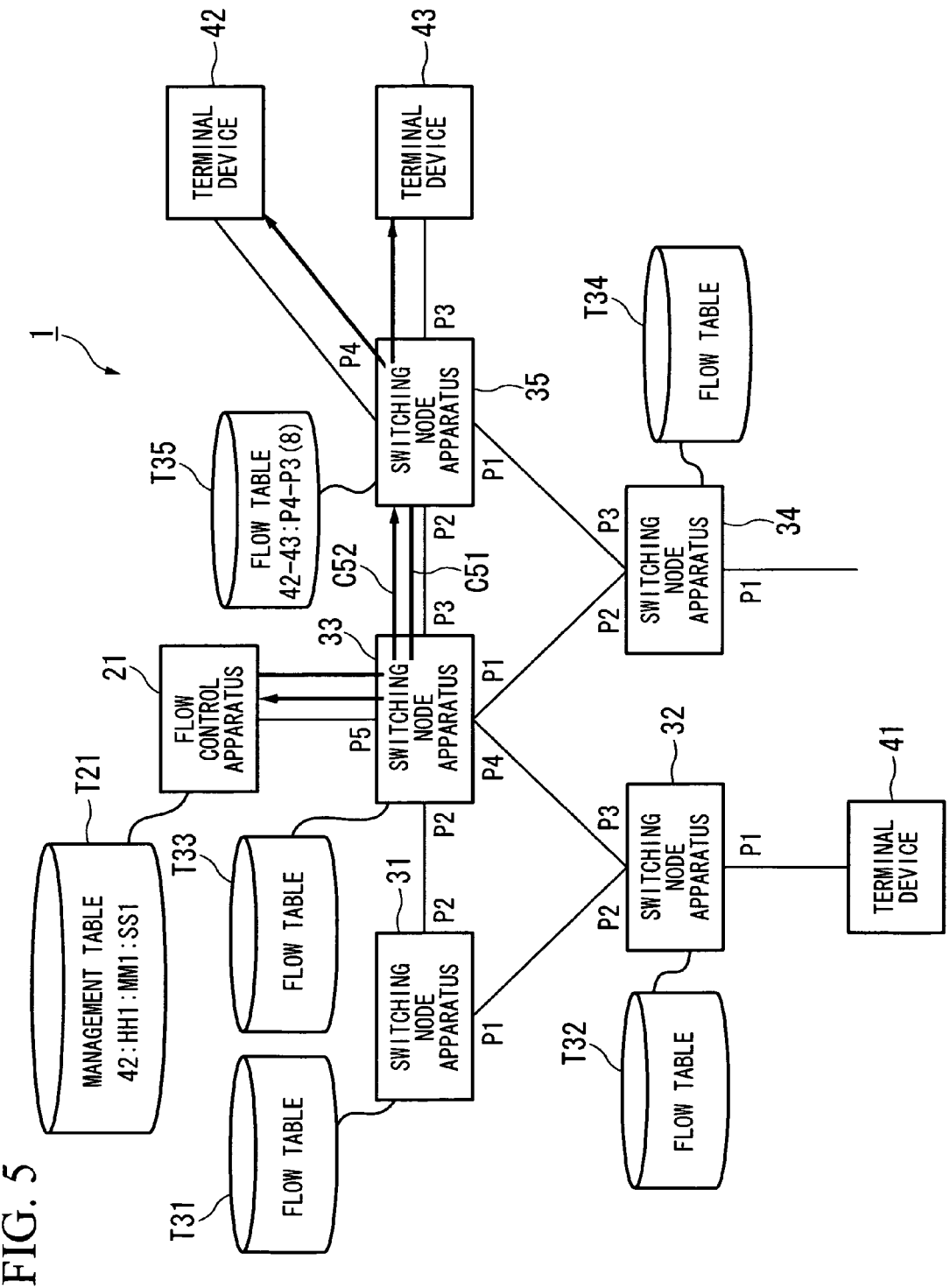
FIG. 5 is a diagram showing a data flow when the effective time has elapsed in the embodiment.

FIG. 5 is a diagram showing a data flow when the effective time has elapsed. In FIG. 5, at the timing corresponding to respective effective times shown in the flow tables T31 to T35, the switching node apparatuses 31 and 35 each issues an inquiry to the flow control apparatus 21 and updates the flow table.

More specifically, FIG. 5 shows an inquiry action performed by the switching node apparatus 35 when communication between the terminal devices 42 and 43 is again executed within the effective time of 4 seconds (shown in the flow table T35) measured from when the switching node apparatus 35 sends an inquiry packet to the flow control apparatus 21 (see FIG. 4).

In this case, when the effective time (4 sec) has elapsed, the switching node apparatus 35 sends an inquiry packet to the flow control apparatus 21 (see arrow C51).

In response thereto, the flow control apparatus 21 generates a response packet so as to set an effective time of 8 sec, which is as twice as the previous effective time, and sends the response packet to the switching node apparatus 35 (see arrow C52).

The switching node apparatus 35 then retrieves the control information and the effective time from the response packet, and updates the flow table T35. Accordingly, the information of the effective time stored in the flow table T35 is updated from 4 sec to 8 sec.

Then similar to the initial inquiry, the switching node apparatus 35 performs communication transfer based on the control information stored in the flow table T35.

After that, if communication between the terminal devices 42 and 43 is again performed during the effective time measured from the latest inquiry, then the following operation is repeated: (i) the switching node apparatus 35 sends an inquiry packet to the flow control apparatus 21 when the effective time has elapsed, and (ii) the flow control apparatus 21 sends to the switching node apparatus 35, a response packet so as to set an effective time as twice as the previous effective time.

In contrast, if communication between the terminal devices 42 and 43 is not again performed during the effective time measured from the latest inquiry, the switching node apparatus 35 deletes the information of the relevant communication flow from the flow table T35.

Figure 6:
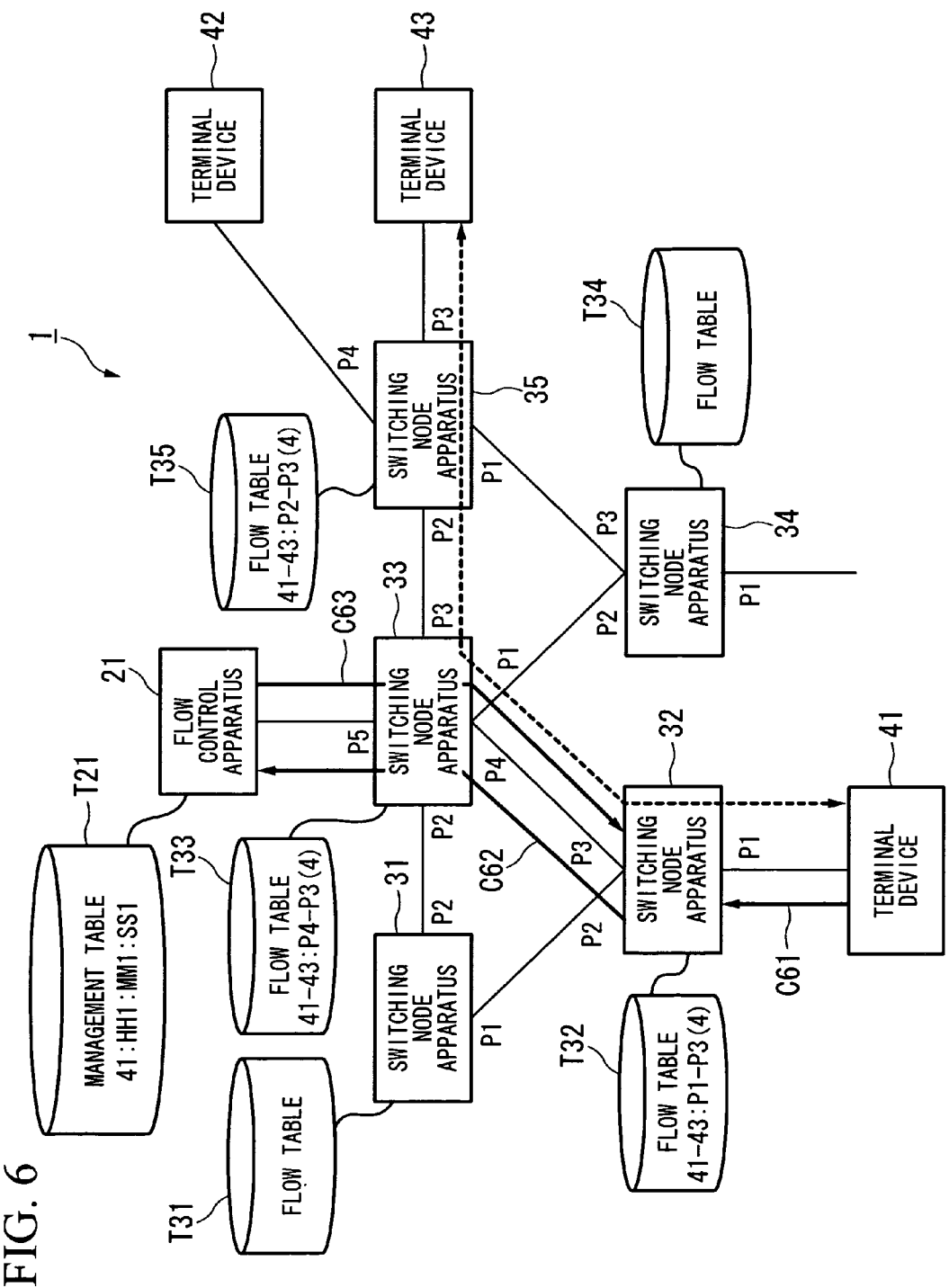
FIG. 6 is a diagram showing a data flow before the terminal device changes the switching node apparatus to which it connects, in the embodiment.

FIG. 6 is a diagram showing a data flow before the terminal device changes the switching node apparatus to which it connects.

First, the terminal device 41 sends an initial packet to the terminal device 32 (see arrow C61). The switching node apparatus 32 which received the initial packet sends an inquiry packet to the flow control apparatus 21 (see arrow C62).

Similar to the flow in FIG. 4, the flow control apparatus which received the inquiry packet generates a response packet which indicates an effective time of 4 sec, and sends the response packet to the switching node apparatus 32 (see arrow C63). The switching node apparatus 32 stores the control information and the effective time into the flow table T32, so as to control the relevant flow based on the control information.

The switching node apparatus 32 also transfers the initial packet to the switching node apparatus 33. Similar to the switching node apparatus 32, the switching node apparatus 33 sends an inquiry packet and receives a response packet.

Furthermore, the switching node apparatus 33 transfers the initial packet to the switching node apparatus 35. Again similar to the switching node apparatus 32, the switching node apparatus 35 sends an inquiry packet and receives a response packet.

Accordingly, a communication route via the switching node apparatuses 32, 33, and 35 has been established.

Figure 7:
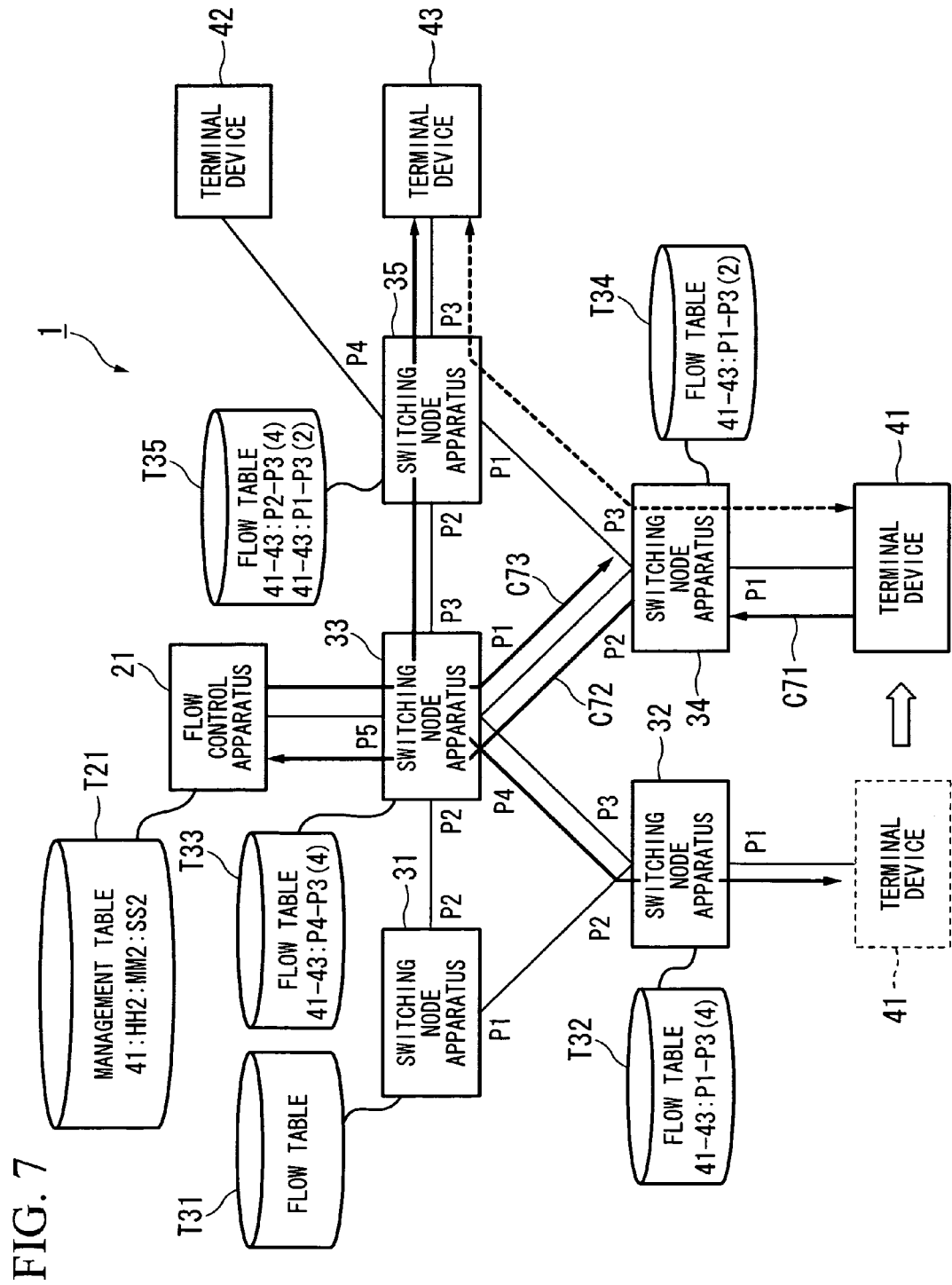
FIG. 7 is a diagram showing a data flow after the terminal device changes the switching node apparatus to which it connects, in the embodiment.

FIG. 7 is a diagram showing a data flow after the terminal device changes the switching node apparatus to which it connects. More specifically, FIG. 7 shows an inquiry action performed by the switching node apparatus 34 when the switching node apparatus, to which the terminal device 41 is connected, is changed from the switching node apparatus 32 to the switching node apparatus 34 before the effective time has elapsed after the communication route via the switching node apparatuses 32, 33, and 35 was established in FIG. 6.

First, the terminal device 41 sends an initial packet to the switching node apparatus 34 as a new target to be connected (see arrow C71). The switching node apparatus 34 which received the initial packet sends an inquiry packet to the flow control apparatus 21 (see arrow C72). The flow control apparatus 21 which received the inquiry packet determines whether or not the target to which the relevant terminal device is connected has been changed, and updates the management table.

In the example shown in FIG. 7, as the target switching node apparatus to be connected to the terminal device 41, the storage unit 270 stores the switching node apparatus 32 which is the target before the relevant change. In contrast, the target to be connected, which is indicated by the inquiry packet, is the switching node apparatus 34.

When the connection target stored in the storage unit 270 differs from that indicated by the inquiry packet, as shown above, the flow control apparatus 21 determines that the terminal device has changed the switching node apparatus to be connected, and changes the connection start time of the relevant terminal device, which is stored in the management table of the storage unit 270, to the transmission time of the inquiry packet, or the like.

The updated connection start time is not limited to the transmission time of the inquiry packet, and may be any time (e.g., current time (when the management table is updated)) within a range from when the terminal device sends the initial packet to the current time.

Next, based on the management table, the flow control apparatus 21 determines whether or not any one of the terminal device which requested the communication and the partner terminal device changed the switching node apparatus to which it connects, during the previous effective time.

In the example shown in FIG. 7, the elapsed time from the connection start time (of the terminal device 41 which requested the communication) to the current time is shorter than 4 sec as the previous effective time. Therefore, the flow control apparatus 21 determines that the terminal device 41 which requested the communication changed the switching node apparatus as the connection target during the previous effective time.

The flow control apparatus 21, which determined that any one of the relevant terminal devices changed the switching node apparatus as the connection target, sends a response packet, by which the effective time is set as half (2 sec in the example of FIG. 7) as the previous effective time, to the switching node apparatus 34.

The switching node apparatus 34 retrieves the control information and the effective time from the response packet, and stores them into the flow table T34, so as to perform the flow control based on the relevant control information.

In the flow table T32 of FIG. 7, the control information of the previous communication route remains, that is, the effective time is "(4)" (4 sec) which coincides with that shown in FIG. 6. In contrast, the flow table T34 has control information about the new communication route, that is, the effective time is "(2)" (2 sec) as half as the previous effective time.

The switching node apparatus 34 transfers the initial packet to the switching node apparatus 35. Similar to the switching node apparatus 34, the switching node apparatus 35 sends an inquiry packet and receives a response packet.

The switching node apparatus 35 retrieves the control information and the effective time from the received response packet, and stores the retrieved data into the flow table T35, so as to perform the transfer control of the relevant flow. Accordingly, a communication route via the switching node apparatuses 34 and 35 is established.

For the previous communication route, if no communication via this route is performed during the corresponding effective time, the switching node apparatuses 32, 34, and 35 delete the control information and the effective time from the respective flow tables T32, T34, and T35, thereby cancelling the previous communication route.

Figure 8:
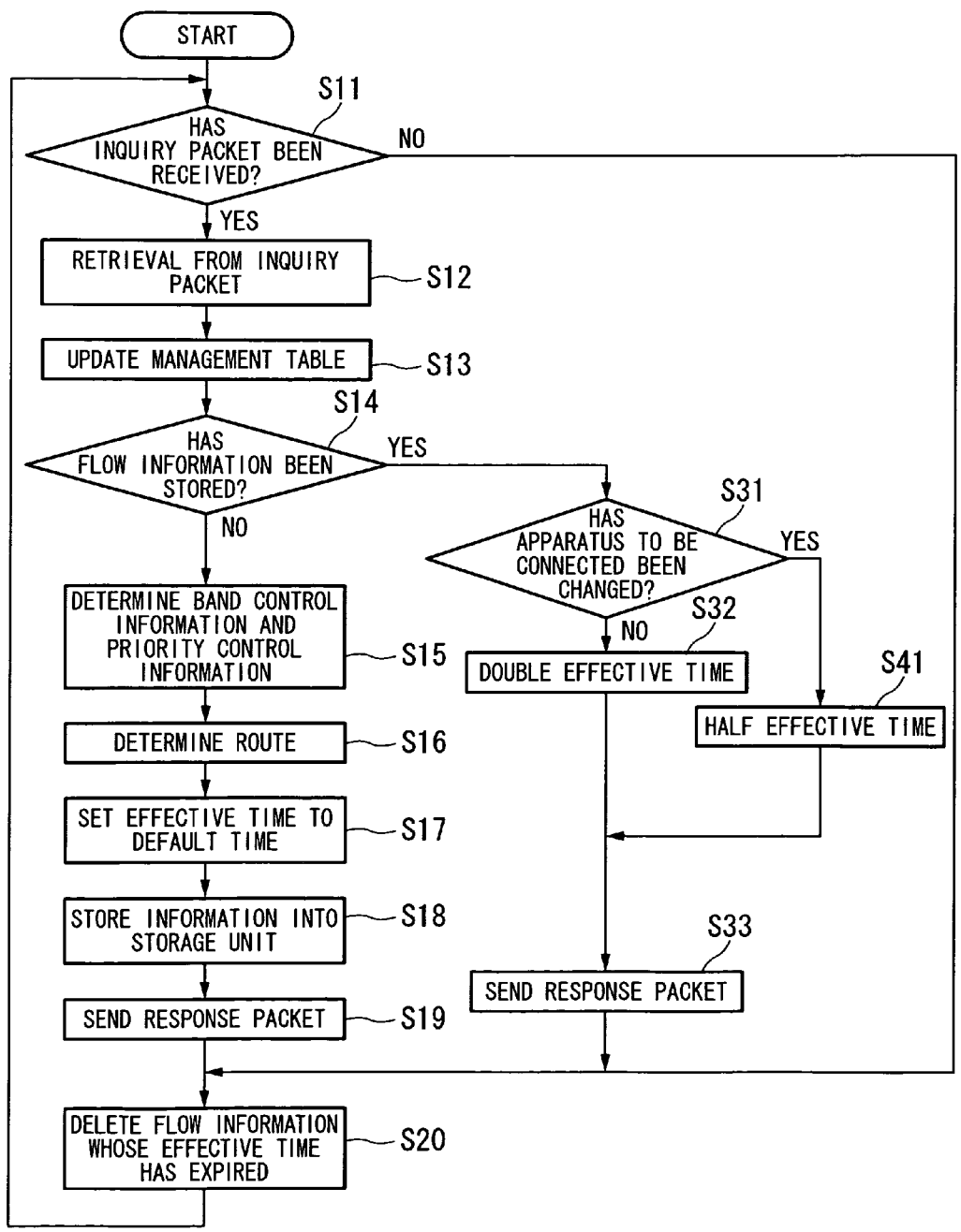
FIG. 8 is a diagram showing an operation flow in which the flow control apparatus 21 receives an inquiry packet, and then sends a response packet, in the embodiment.

FIG. 8 is a diagram showing an operation flow in which the flow control apparatus 21 receives an inquiry packet, and then sends a response packet.

In step S11, the control unit 220 determines whether or not the sending and receiving unit 210 has received an inquiry packet. If it is determined that the inquiry packet has been received (see "YES" for step S11), the operation proceeds to step S12. If it is determined that the inquiry packet has not been received (see "NO" for step S11), the operation proceeds to step S20.

In step S12, the control unit 220 retrieves from the inquiry packet, identification information for the terminal device which requests communication; identification information for the switching node apparatus to which the terminal device which requests communication is connected; a port number to which the terminal device which requests communication is connected; and identification information for the terminal device as the partner of the relevant communication. The control unit 220 further checks identification information for the switching node apparatus to which the terminal device as the communication partner is connected;

a port number to which the terminal device as the communication partner is connected; and flow type information.

In step S13, the control unit 220 outputs to the management table updating unit 260, the identification information for the terminal device which requests communication; the identification information for the switching node apparatus to which the terminal device which requests communication is connected; the port number to which the terminal device which requests communication is connected; and the inquiry packet transmission time. The management table updating unit 260 updates the management table in the storage unit 270.

Specifically, first, the management table updating unit 260 retrieves the route information of the relevant flow by using key information which is the identification information for the terminal device which requests communication; the identification information of the partner terminal device; and the flow type information.

The management table updating unit 260 then compares the retrieved route information with the identification information for the switching node apparatus to which the terminal device which requests communication is connected; and the port number to which this terminal device is connected, so as to determine whether or not the switching node apparatus, to which the terminal device which requests communication is connected, has been changed.

If it is determined that the change has occurred, the management table updating unit 260 changes the connection start time of the relevant terminal device, which is stored in the management table of the storage unit 270, to the inquiry packet transmission time. If it is determined that the change has not occurred, no action is performed.

In the above process, if the connection start time of the relevant terminal device has not yet been stored in the management table, the management table updating unit 260 newly stores the inquiry packet transmission time as the connection start time of the relevant terminal device, into the management table.

In step S14, the control unit 220 determines whether or not the flow information, which includes information retrieved from the inquiry packet, has already been stored in the storage unit 270.

If it is determined that the flow information has already been stored (see "YES" in step S14), the operation proceeds to step S31. If it is determined that the flow information has not yet been stored (see "NO" in step S14), the operation proceeds to step S15.

In step S15, the control unit 220 outputs information, which was retrieved or checked in step S12, to the band control and priority control information determination unit 240. The band control and priority control information determination unit 240 determines band control information and priority control information for the flow indicated by the inquiry packet, and outputs the determined information to the control unit 220.

In step S16, the control unit 220 outputs information, which was retrieved or checked in step S12, to the route determination unit 230. The route determination unit 230 determines a route assigned to the flow indicated by the inquiry packet, and outputs route information to the control unit 220.

In step S17, the effective time setting unit 250 sets the effective time of the control information for the relevant flow to 4 sec, which is a predetermined default value. The effective time setting unit 250 outputs information about the effective time to the control unit 220.

In step S18, the control unit 220 stores the information retrieved or checked in step S12; the band control information; the priority control information; the route information; and the effective time information, as the flow information for the relevant flow, into the storage unit 270.

In step S19, the control unit 220 retrieves the output port number of the switching node apparatus as the addressee of the response packet, from the route information determined by the route determination unit 230, and generates a response packet which indicates the control information (including the relevant port number, the band control information, and the priority control information) and the effective time information. The control unit 220 sends the generated response packet to the relevant switching node apparatus.

In step S20, for each flow information item stored in the storage unit 270, the control unit 220 compares the effective time of the flow information with the elapsed time measured from when the flow information was stored to the current time, so as to delete each flow information item whose effective time has expired.

In the above process, in order to prevent an erroneous deletion (before reception of an inquiry packet) of flow information, for which the effective time should be updated in response to the transmission of the inquiry packet from the switching node apparatuses 31 to 35, when the switching node apparatuses 31 to 35 delete the control information from the corresponding flow tables T31 to T35, they may output a packet, which indicates the relevant deletion, to the flow control apparatus 21, and the flow control apparatus 21 may delete the corresponding flow information when receiving this packet.

After step S20 is executed, the operation returns to step S11.

In step S31, the control unit 220 determines whether or not the terminal device which requests the communication or the partner terminal device has changed the switching node apparatus to which the terminal device is connected, during the previous effective time.

Specifically, the control unit 220 retrieves the connection start time of the terminal device which requested the communication and the connection start time of the partner terminal device from the management table T21 of the storage unit 270, and also retrieves the effective time for the flow information of the target flow from the storage unit 270.

The control unit 220 then compares the effective time with an elapsed time measured from the connection start time of the terminal device which requested the communication to the current time. If the elapsed time is longer, it is determined that no change has occurred. If the effective time is longer, it is determined that a relevant change has occurred.

Similarly, the control unit 220 compares the effective time with an elapsed time measured from the connection start time of the partner terminal device to the current time. If the elapsed time is longer, it is determined that no change has occurred. If the effective time is longer, it is determined that a relevant change has occurred.

If it is determined that any one of the terminal devices has changed the switching node apparatus to which the terminal device is connected (see "YES" in step S31), the operation proceeds to step S41. If it is determined that both terminal devices have not changed the switching node apparatus to which each terminal device is connected (see "NO" in step S31), the operation proceeds to step S32.

In step S32, the effective time setting unit 250 sets the updated effective time to a value as twice as the previous effective time, and outputs the set effective time to the control unit 220.

In step S33, the control unit 220 stores the updated effective time into the storage unit 270. The control unit 220 also retrieves the control information of the relevant flow from the storage unit 270, generates a response packet based on the retrieved control information, and sends the generated response packet via the sending and receiving unit 210 to the target switching node apparatus. The operation then proceeds to step S20.

In contrast, in step S41, the effective time setting unit 250 sets the updated effective time to a value as half as the previous effective time, and outputs the set effective time to the control unit 220. The operation then proceeds to step S33.

Figure 9:
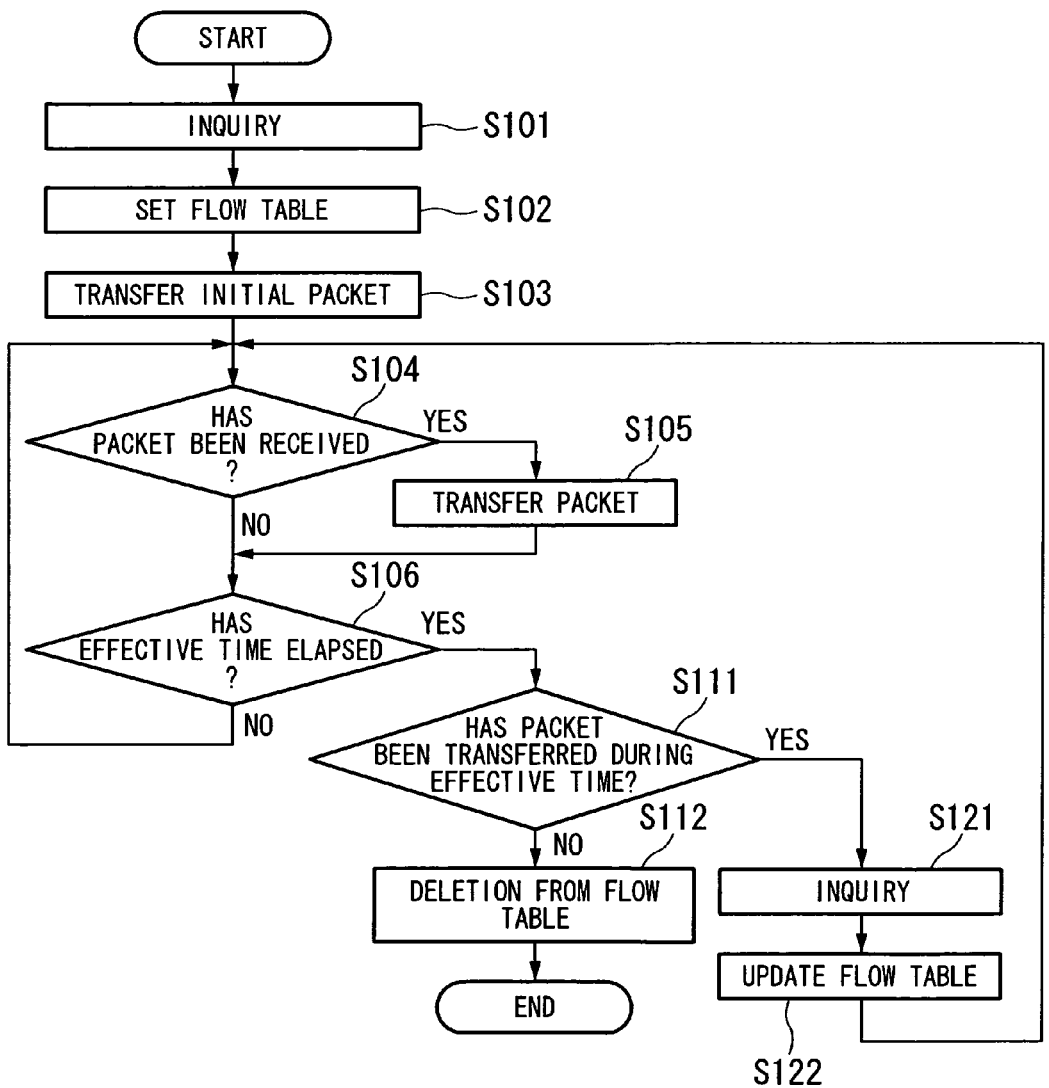
FIG. 9 is a diagram showing an operation flow for the control of each flow, performed by the switching node apparatuses 31 to 35, in the embodiment.
Figure 11:
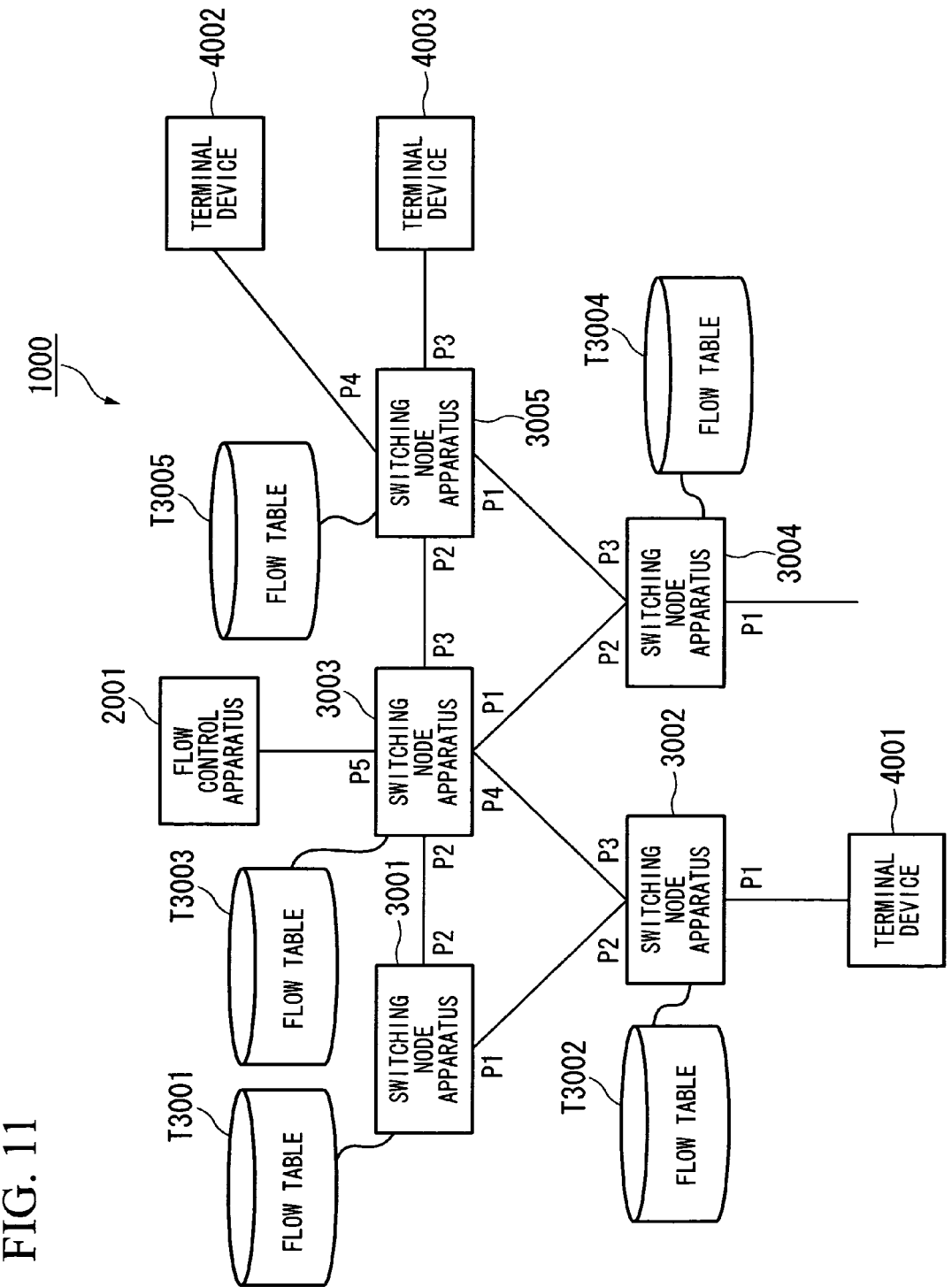
FIG. 11 is a diagram showing an example of a network configuration using the open flow switching technique.
Figure 12:
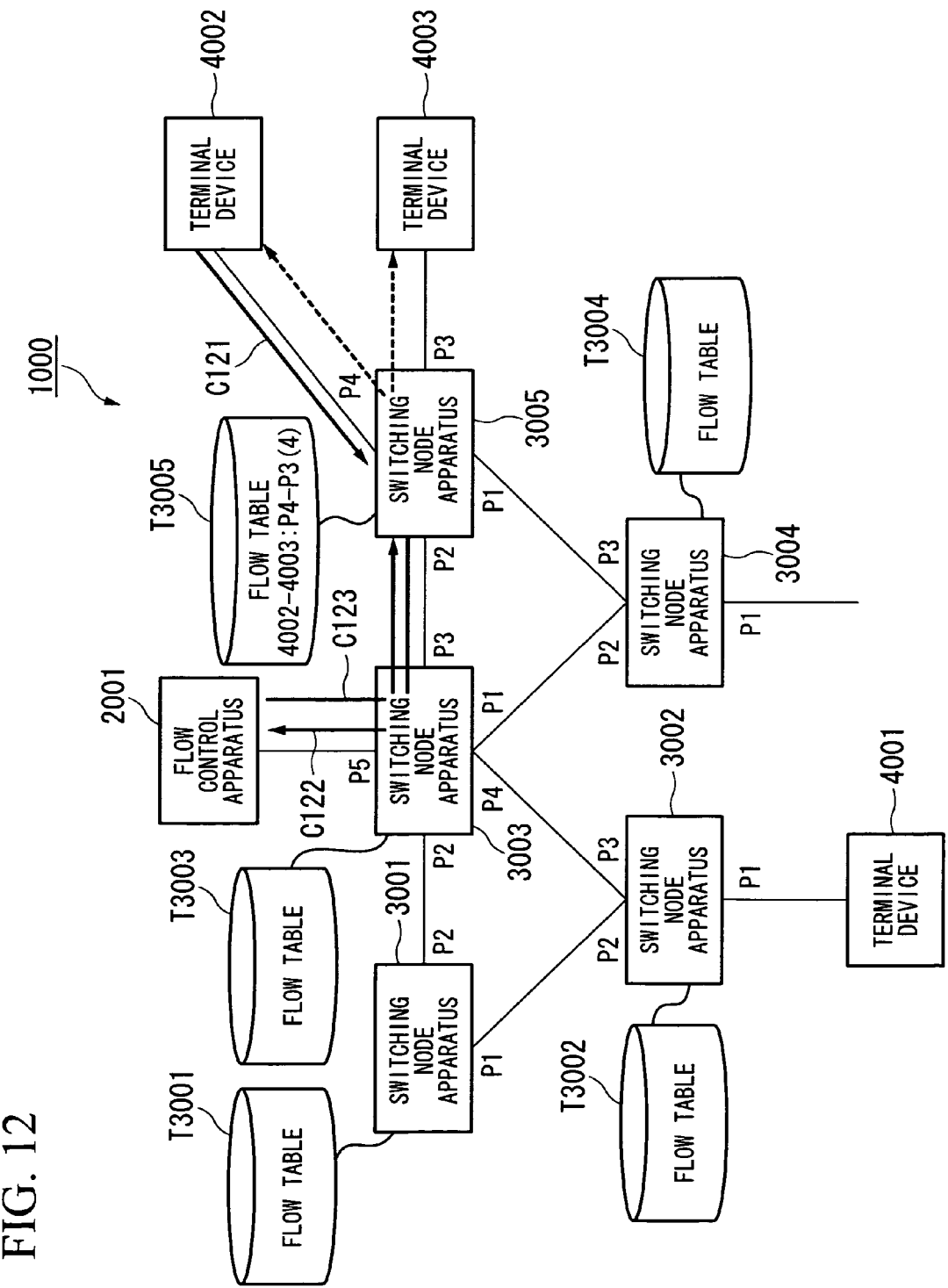
FIG. 12 is a diagram showing a data flow when a terminal device connected to a switching node apparatus starts communication.
Figure 13:
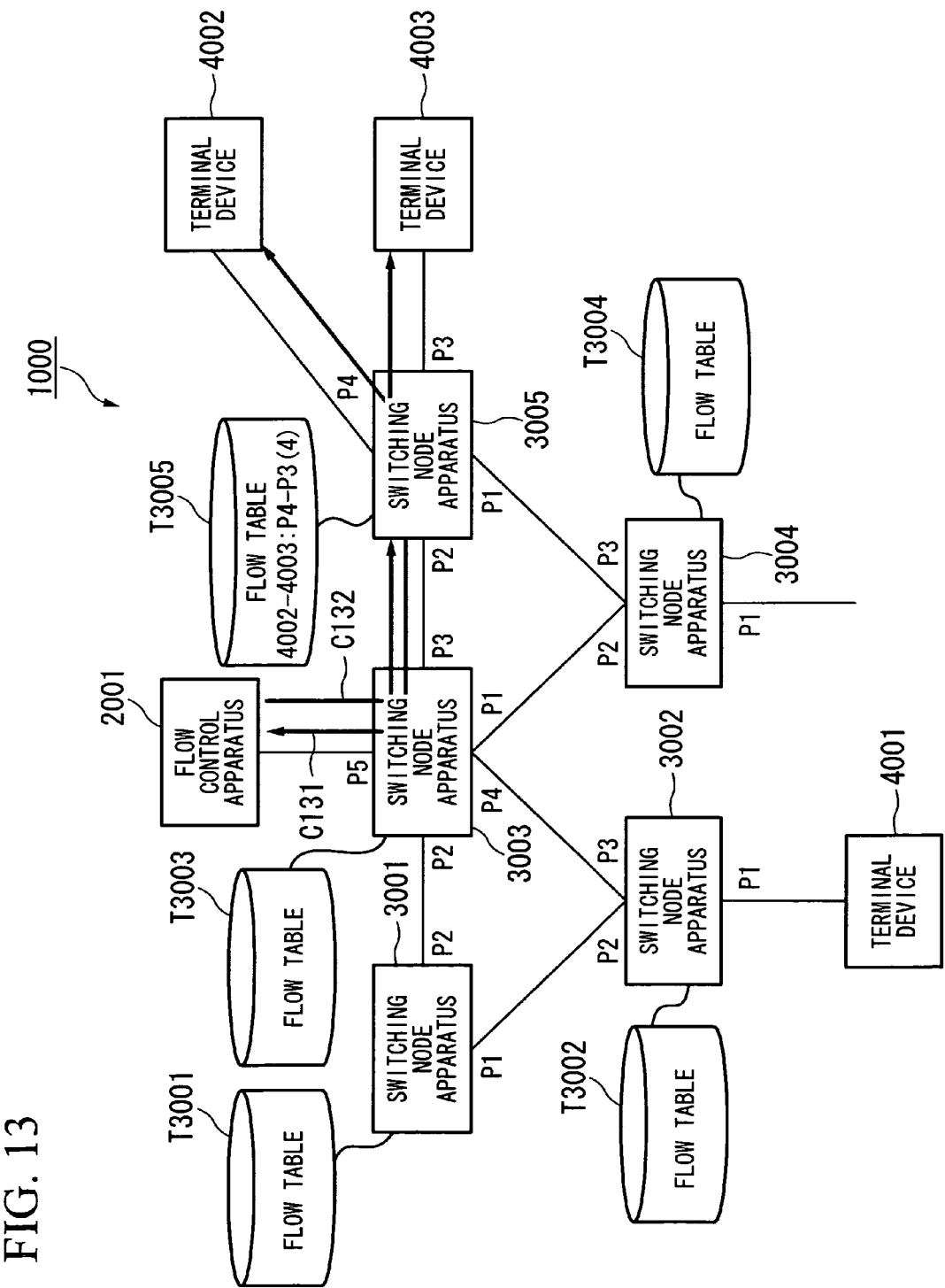
FIG. 13 is a diagram showing a data flow when the effective time has elapsed.
Figure 14:
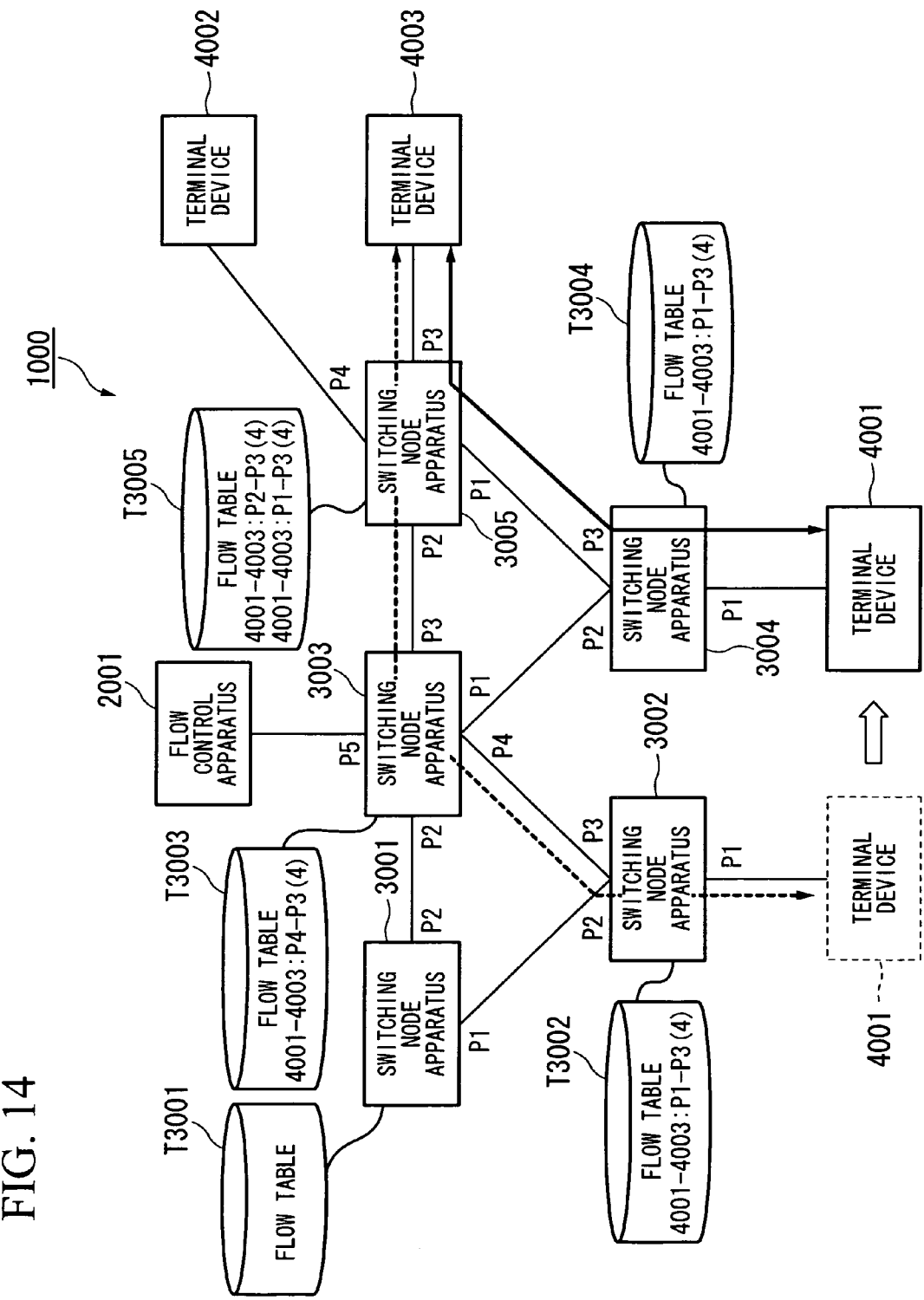
FIG. 14 is a diagram showing a data flow when a terminal device changes the switching node apparatus to which the terminal device is connected.

FIG. 9 is a diagram showing an operation flow for the control of each flow, performed by the switching node apparatuses 31 to 35. When receiving an initial packet from a terminal device, the switching node apparatuses 31 to 35 each starts the operation shown in FIG. 9.

In step S101, the control circuit 320 generates an inquiry packet in response to the received initial packet, and sends the inquiry packet to the flow control apparatus 21 via any one of the ports P1 to P5.

In step S102, any one of the ports P1 to P5 receives the response packet which is output to the control unit 320. The control unit 320 retrieves the control information and the effective time from the response packet, and stores the retrieved data into the flow table (T31 to T35) in the storage unit 330.

In step S103, the control unit 320 transfers the initial packet via a port (to which the packet is transferred from the terminal device) which is designated to be the output port in the control information.

In step S104, the control unit 320 determines whether or not the packet has been received from the relevant terminal device. If it is determined that the packet has been received (see "YES" in step S104), the operation proceeds to step S105. If it is determined that the packet has not been received (see "NO" in step S104), the operation proceeds to step S106.

In step S105, the control unit 320 transfers the received packet via the port (i.e., the output port designated in the control circuit) in accordance with the control information stored in the flow table (T31 to T35).

In step S106, the control unit 320 determines whether or not the effective time has elapsed from the previous inquiry. If it is determined that the time has elapsed (see "YES" in step S106), the operation proceeds to step S111. If it is determined that the time has not elapsed (see "NO" in step S106), the operation returns to step S104.

In step S111, the control unit 320 determines whether or not a packet from a terminal device has been received and transferred during the effective time. If it is determined that the packet has been received and transferred (see "YES" in step S111), the operation proceeds to step S121. If it is determined that the packet has not been received and transferred (see "NO" in step S111), the operation returns to step S112.

In step S112, the control unit 320 deletes the control information and the effective time of the relevant flow from the flow table (T31 to T35) stored by the storage unit 330. Then the switching node apparatuses 31 to 35 each complete the operation for controlling the relevant node apparatus.

In contrast, in step S121, the control unit 320 generates an inquiry packet, and sends it to the flow control apparatus 21.

In step S122, any one of the ports P1 to P5 receives the response packet and outputs it to the control unit 320. The control unit 320 retrieves the control information and the effective time from the response packet, and updates the flow table (T31 to T35) stored in the storage unit 330. The operation then returns to step S104.

As described above, the flow control apparatus 21 assigns (i) a relatively short effective time of the control information to a flow for the terminal device which has changed the switching node apparatus to which it connects, and (ii) a relatively long effective time of the control information to a flow for the terminal device which has not changed the switching node apparatus to which it connects. Therefore, in accordance with the frequency of the change for the switching node apparatus to which the terminal device is connected, it is possible to set a relatively short effective time of the control information for the terminal device which relatively frequently changes the switching node apparatus, so that when the switching node apparatus to be connected is changed, the time during which the previous route (before the change) remains can be reduced.

Such remaining of the previous route before the change occurs every time when a terminal device changes the switching node apparatus to which it connects. Therefore, when reducing the effective time for each terminal device which frequently changes the target switching node apparatus, it is possible to reduce a time during which a more number of previous routes remains, thereby reducing the possibility of occurrence of a failure caused by the remaining of the previous route.

In contrast, it is possible to assign a relatively long effective time of the control information to each terminal device which does not perform such a change frequently, thereby preventing the amount of communication on the network from increasing.

In addition, the effective time is determined based on whether or not the terminal device has actually changed the switching node apparatus to which it connects. Therefore, it is possible to assign a relatively long effective time to a terminal device (e.g., a notebook personal computer used only on a specific desk) which can change the target switching node apparatus but is actually fixedly connects to a specific switching node apparatus, thereby preventing the amount of communication on the network from increasing.

When the effective time setting unit 250 sets the effective time, a minimum time may be applied to it (e.g., no effective time shorter than 1 sec is set). Accordingly, an increase in the amount of communication on the network can be prevented while avoiding an extremely short effective time.

In contrast, a maximum time for the effective time may be set, for example, the effective time setting unit 250 does not set an effective time longer than 128 sec. Accordingly, an increase in the time during which the previous route remains (after the terminal device changes the switching node apparatus to which it connects) can be prevented while avoiding an extremely long effective time.

Additionally, the next effective time, which is set by the effective time setting unit 250 to a value shorter than the previous effective time, is not limited to a value as half as the previous effective time. That is, the next effective time may be set to a value obtained by subtracting a predetermined unit time (e.g., 1 sec) from the previous effective time.

Also in this case, a relatively short effective time of the control information can be assigned to a flow of a terminal device which frequently changes the connection target, so that it is possible to prevent an increase in the time during which the previous route remains after the terminal device changes the switching node apparatus as the connection target. Additionally, similar to the above-described case, a minimum effective time may be set also in this case so as to prevent the setting of an extremely short effective time, thereby preventing an increase in the amount of communication on the network.

In addition, the next effective time, which is set by the effective time setting unit 250 to a value longer than the previous effective time, is not limited to a value as twice as the previous effective time. That is, the next effective time may be set to a value obtained by adding a predetermined unit time (e.g., 1 sec) to the previous effective time.

Also in this case, a relatively long effective time of the control information can be assigned to a flow of a terminal device which does not frequently change the connection target, so that it is possible to prevent an increase in the amount of communication on the network. Additionally, similar to the above-described case, a maximum effective time may be set also in this case so as to prevent the setting of an extremely long effective time, thereby preventing an increase in the time during which the previous route remains after the terminal device changes the switching node apparatus as the connection target.

In another example, as shown in FIG. 10, the storage unit 270 may store a correspondence table which shows corresponding relationships between the effective time of the control information for the flow tables T31 to T35 and difference between the current time and a previous movement time at which each terminal device latest changed the switching node apparatus to which it connects (if no change has occurred, the previous movement time is set to the communication start time). In this case, the effective time setting unit 250 sets the effective time based on the correspondence table. Accordingly, it is possible to perform more careful setting of the effective time.

A program for executing all or part of the functions of the flow control apparatus 21 may be stored in a computer readable storage medium, and the program stored in the storage medium may be loaded and executed on a computer system, so as to perform the operation of each unit. Here, the computer system has hardware resources which include an OS and peripheral devices.

If the computer system employs a WWW system, the computer system can provide a homepage viewable environment.

The above computer readable storage medium is a storage device, for example, a portable medium such as a flexible disk, magneto optical disk, ROM, or CD-ROM, or a memory device such as a hard disk built in a computer system.

The computer readable storage medium also covers (i) a device for dynamically storing the program for a short time, such as a communication line used when sending the program via a network (e.g., the Internet) or a communication line (e.g., a telephone line), (ii) or a device for temporarily storing the program, such as a volatile storage medium (RAM) in a computer system which functions as a server or client for such a program transmission.

In addition, the program may execute a part of the above-explained functions, or may be a program by which the above-described functions can be executed by a combination program of this program and an existing program which has already been stored in the relevant computer system.

The embodiments of the present invention have been explained in detail with reference to the drawings. However, concrete structures are not limited to the embodiments, and also include design modifications or the like, within the scope of the present invention

INDUSTRIAL APPLICABILITY

The present invention is preferably applied to a flow control apparatus, a network system, a network control method, and a program. For example, the present invention can be applied to a mobile communication network using an open flow switching technique.

REFERENCE SYMBOLS

1 network system
21 flow control apparatus
31 to 35 switching node apparatus
41-43 terminal device
210 sending and receiving unit 210
220, 320 control unit 220
230 route determination unit 230
240 band control and priority control information determination unit 240
250 effective time setting unit 250
260 management table updating unit 260
270, 330 storage unit 270
P1 to P5 port

The invention claimed is:

1. A flow control apparatus that sends control information to one or more switching node apparatuses, where the control information is assigned to each series of communications performed between terminal devices via the switching node apparatuses, the flow control apparatus comprising:
an effective time setting unit configured to set an effective time of the control information based on an elapsed time measured from when the terminal devices which perform the series of communications start a communication via a specific one of the switching node apparatuses, in a manner such that a longer the elapsed time, a longer the effective time is set; and
a sending unit that sends the control information every time when the effective time has elapsed.

2. The flow control apparatus in accordance with claim 1, wherein the effective time setting unit determines whether or not at least one of the terminal devices has changed a switching node apparatus to which it connects, and if it is determined that a change has occurred, the effective time is set to a shorter time than an effective time set when it is determined that the change has not occurred.

3. The flow control apparatus in accordance with claim 2, wherein, if it is determined that none of the terminal devices has changed the switching node apparatus to which it connects, then the effective time setting unit sets a next effective time as twice a currently-set effective time.

4. The flow control apparatus in accordance with claim 2, wherein, if it is determined that none of the terminal devices has changed the switching node apparatus to which it connects, then the effective time setting unit sets a next effective time by adding a predetermined time to a currently-set effective time.

5. The flow control apparatus in accordance with claim 2, wherein, if it is determined that at least one of the terminal devices has changed the switching node apparatus to which it connects, then the effective time setting unit updates the effective time to be a value as half a relevant effective time.

6. The flow control apparatus in accordance with claim 2, wherein, if it is determined that at least one of the terminal devices has changed the switching node apparatus to which it connects, then the effective time setting unit sets a next effective time by subtracting a predetermined time from a currently-set effective time.

7. The flow control apparatus in accordance with claim 1, further comprising:
a storage unit that stores a correspondence table which shows corresponding relationships between the effective time and an elapsed time measured from when each terminal device connects a specific one of the switching node apparatuses,
wherein the effective time setting unit sets a next effective time based on the correspondence table.

8. A network system comprising one or more switching node apparatuses and a flow control apparatus that sends control information assigned to each series of communications performed between terminal devices via the switching node apparatuses, wherein the flow control apparatus comprises:
an effective time setting unit that sets an effective time of the control information based on an elapsed time measured from when the terminal devices which perform the series of communications start a communication via a specific one of the switching node apparatuses, in a manner such that a longer the elapsed time, a longer the effective time is set; and
a sending unit that sends the control information every time when the effective time has elapsed,
wherein the switching node apparatuses perform communication control based on the control information.

9. A network control method for a flow control apparatus that sends control information to one or more switching node apparatuses, where the control information is assigned to each series of communications performed between terminal devices via the switching node apparatuses, the flow control apparatus performing:
an effective time setting that sets an effective time of the control information based on an elapsed time measured from when the terminal devices which perform the series of communications start a communication via a specific one of the switching node apparatuses, in a manner such that a longer the elapsed time, a longer the effective time is set; and
a sending that sends the control information every time when the effective time has elapsed.

10. A non-transitory computer-readable storage medium that stores a program by which a flow control apparatus, that sends control information to one or more switching node apparatuses, where the control information is assigned to each series of communications performed between terminal devices via the switching node apparatuses, the flow control apparatus executing:
an effective time setting that sets an effective time of the control information based on an elapsed time measured from when the terminal devices which perform the series of communications start a communication via a specific one of the switching node apparatuses, in a manner such that a longer the elapsed time, a longer the effective time is set; and
a sending that sends the control information every time when the effective time has elapsed.

11. The flow control apparatus in accordance with claim 1, wherein after starting the communication, a time that elapses before a next transmission of the control information is changed.

12. The flow control apparatus in accordance with claim 1, wherein a shorter effective time of the control information is assigned to a flow for one of the terminal devices which has changed one of the switching node apparatuses to which the one of terminal devices connects than an effective time of the control information to a flow for another one of the terminal devices which has not changed another one of the switching node apparatuses to which said another one of terminal devices connects.

13. The flow control apparatus in accordance with claim 1, wherein the effective time of the control information for the terminal devices is set in accordance with a frequency of a change for the switching node apparatuses to which the terminal devices are connected.

14. The flow control apparatus in accordance with claim 13, wherein, when the switching node apparatuses are changed, a time during which a previous route remains is reduced.

15. The flow control apparatus in accordance with claim 14, wherein a remaining of a previous route, before the change for the switching node apparatus, occurs every time when one of terminal devices changes one of the switching node apparatuses to which the one of terminal devices connects.

16. The flow control apparatus in accordance with claim 1, wherein the effective time for one of the terminal devices which frequently changes a target switching node apparatus is reduced to reduce a time during which a number of previous routes remains.

17. The flow control apparatus in accordance with claim 16, wherein a longer effective time of the control information to each of terminal devices which does not frequently changes the target switching node apparatus than the effective time for said one of the terminal devices which frequently changes the target switching node apparatus.

18. The network system in accordance with claim 8, wherein after starting the communication, a time that elapses before a next transmission of the control information is changed.

19. The network control method in accordance with claim 9, wherein after starting the communication, a time that elapses before a next transmission of the control information is changed.

20. The non-transitory computer-readable storage medium in accordance with claim 10, wherein after starting the communication, a time that elapses before a next transmission of the control information is changed.

* * * * *